(No Model.)

W. C. WESTAWAY.
EYEGLASSES.

No. 449,605. Patented Mar. 31, 1891.

WITNESSES
A. J. Schwartz
A. E. Grant

Walter C. Westaway
INVENTOR
By W. T. FitzGerald & Co.
Attorneys.

UNITED STATES PATENT OFFICE.

WALTER C. WESTAWAY, OF DECORAH, IOWA, ASSIGNOR OF ONE-HALF TO HARRY C. GODDARD AND GEORGE I. LEONARD, BOTH OF SAME PLACE.

EYEGLASSES.

SPECIFICATION forming part of Letters Patent No. 449,605, dated March 31, 1891.

Application filed August 25, 1890. Serial No. 362,940. (No model.)

*To all whom it may concern:*

Be it known that I, WALTER C. WESTAWAY, a citizen of the United States, residing at Decorah, in the county of Winneshiek and State of Iowa, have invented certain new and useful Improvements in Eyeglasses; and I do hereby declare the following to be a full, clear, and exact description of the invention, such as will enable others skilled in the art to which it appertains to make and use the same.

My invention consists in certain new and useful improvements in eyeglasses, which will be hereinafter fully described and claimed.

Figure 1:
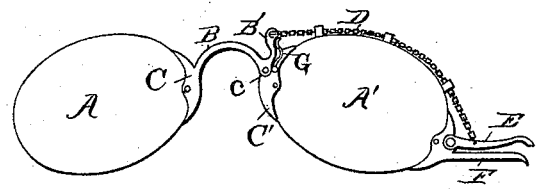
Figure 2:
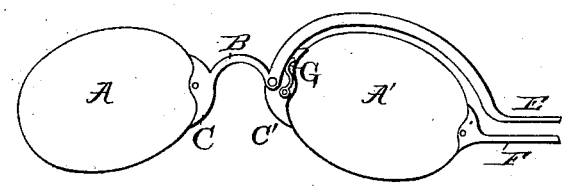
Figure 3:
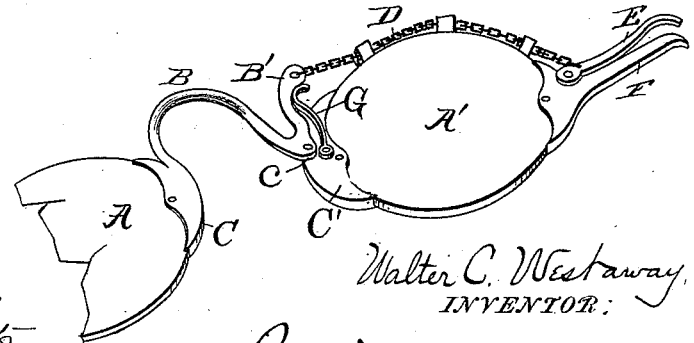

Referring to the accompanying drawings, Figure 1 is a side view of a pair of eyeglasses constructed according to my invention. Fig. 2 is a similar view showing a slightly-varied form of the invention, and Fig. 3 is a perspective view of the glasses shown in Fig. 1.

The same letters of reference indicate corresponding parts in all the figures.

Referring to the several parts by letter, A and A' indicate the glasses of a pair of eyeglasses, which may or may not be encircled by frames.

B indicates a bow, which has secured to one end, either integrally or otherwise, a nose-plate C, and at the other end of its curve it is pivoted to the nose-plate C' of the other glass at the point *c*, as shown.

In Figs. 1 and 3 I have shown the free end B' of the bow B extended upward, and a minute chain D is secured to it, the other end of this chain being secured to a small finger-lever E, pivoted at its inner end upon the base-plate of a thumb-piece F, which is secured to the outer end of the glass A'.

To adjust the glass upon the nose, the wearer takes hold of the glasses with his thumb under the piece F and his finger over the lever E, pressing them together, thereby causing the bow B to turn on its pivot *c* under the "pull" of the fine chain D, and compressing the small spring G, which is arranged as shown. The distance between the nose-plates C and C' is thus increased, and the wearer places the nose-plate C' against the side of his nose with the bow B resting on the top of the nose, and then releases the pressure at the points E F, when the action of the spring G on the pivoted bow will press the nose-plate C against the other side of the nose, thereby holding the glasses firmly in position.

In Fig. 2 I dispense with the chain D and separate finger-piece E, and extend the free end of the bow B in a curve over the glass A' with its free end extending above the thumb-piece F.

It will be seen that this form of my invention will operate in precisely the same manner as the form shown in Figs. 1 and 3, and is a little more simple, and therefore cheaper, in its construction.

The advantages of my new and improved eyeglasses are, that these glasses are adjustable on the nose without drawing the corners of the eyes out of their natural position, as occurs in adjusting the ordinary bow-spring glasses, thereby preventing such discomfort and frequent injury of the eyes. Owing to the bow B resting always upon the top of the nose, I do away with the tendency of all glasses made with a spring-bow to tip outward and fall off the nose, because of their top-heaviness, at the least jar or motion of the wearer, and it will be seen that my glasses can be adjusted with one hand and without painfully drawing the skin on the nose in the operation.

Having thus described my invention, what I claim, and desire to secure by Letters Patent, is—

1. A pair of eyeglasses having a spring-actuated bow pivotally connected to one of the glasses, and a connection extending to the outer end of the latter glass, by means of which the bow may be turned on its pivotal point, substantially as set forth.

2. The combination of the bow rigidly connected to one glass and pivotally connected to the other glass, a spring arranged to operate on said pivoted bow, the flat thumb-piece secured to the outer end of the latter glass, and a finger-piece extending above the thumb-piece F and connected to the pivoted bow, substantially as set forth.

3. The combination of the glasses A and A', the bow B, having the upwardly-extending end B', and pivotally connected to the glass A', the spring G, the flat thumb-piece F, secured to the outer end of the glass A', the pivoted finger-lever E, and the fine chain D, connecting the free end of the bow with the finger-lever, substantially as set forth.

4. The combination of the glasses A and A', the nose-plate C', secured to the glass A', the bow B, having the nose-plate C at one end, having the upwardly-extending end B', and pivoted at c to the nose-plate C' of the other glass, the spring G, the flat thumb-piece F, secured to the outer end of the glass A', the pivoted finger-lever E, and the fine chain D, connecting the free end of the bow with the finger-lever, substantially as set forth.

In testimony whereof I affix my signature in presence of two witnesses.

WALTER C. WESTAWAY.

Witnesses:
HARRY C. GODDARD,
GEO. I. LEONARD.